June 10, 1930.  J. P. GLASER ET AL  1,762,514
WEATHER STRIP
Filed Aug. 11, 1928
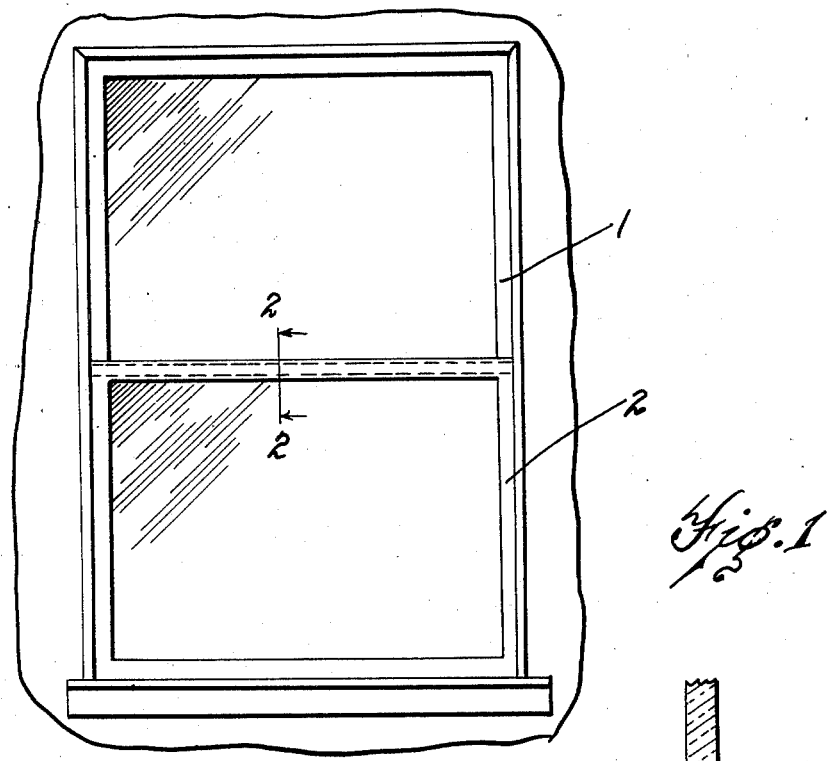
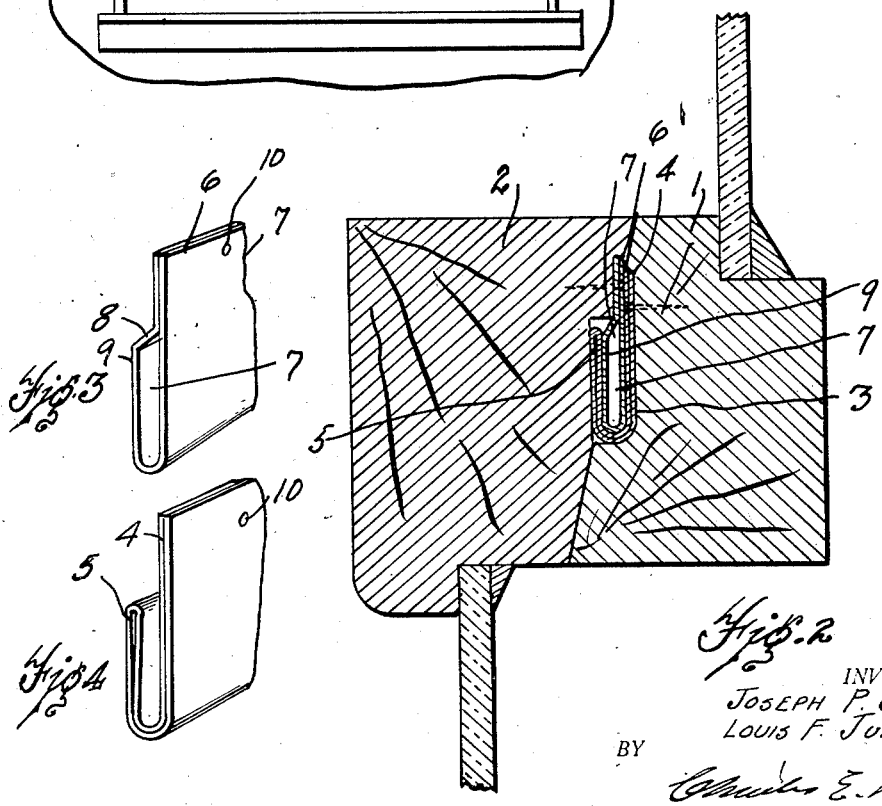
INVENTORS
JOSEPH P. GLASER
LOUIS F. JULIEN
BY
ATTORNEY.

Patented June 10, 1930

1,762,514

UNITED STATES PATENT OFFICE

JOSEPH P. GLASER AND LOUIS F. JULIEN, OF DETROIT, MICHIGAN, ASSIGNORS TO CHAMBERLAIN METAL WEATHERSTRIP CO., OF DETROIT, MICHIGAN, A CORPORATION OF MICHIGAN

WEATHER STRIP

Application filed August 11, 1928. Serial No. 298,994.

This invention relates to weather strips and the object of the invention is to provide a weather strip for the meeting rail between the upper and lower sashes of a window.

Another object of the invention is to provide a weather strip which will seal the space between the upper and lower sashes even when the sashes do not meet properly.

Another object of the invention is to provide a weather strip formed of two parts which engage together in yieldable contact to seal the space between the upper and lower sashes.

These objects and the several novel features of the invention are hereinafter more fully described and claimed and the preferred form of construction by which these objects are attained is shown in the accompanying drawings in which—

Fig. 1 is an elevation of a window to which the weather strip is applied at the meeting rail of the sashes.

Fig. 2 is a greatly enlarged section taken on line 2—2 of Fig. 1.

Fig. 3 is a perspective view of a portion of the weather strip secured to the lower sash.

Fig. 4 is a perspective view of the companion portion of the weather strip secured to the upper sash.

This weather strip is utilized to prevent passage of air between the meeting rails of the upper and lower sashes 1 and 2 shown in Fig. 1. These meeting rails are shown in enlarged section in Fig. 2 and are formed with angular faces which come together as shown in Fig. 2. The meeting rail 1 of the upper sash is recessed at 3 in which the weather strip 4 is positioned. This weather strip 4 is formed from a strip of eight gauge zinc which is bent upon itself to provide a double thickness of metal. In making the bend a space 5 is provided between the two thicknesses of metal to provide a yieldable edge. This yieldable edge is return bent in relation to the body to provide a channel in which the companion strip seats. The companion strip 6 is formed from a strip of nine gauge zinc which is return bent to form a longitudinal chamber 7 having an angular portion 8 which supports and strengthens the edge 9 of the strip 6. The meeting rail 2 is recessed to receive the end 5 of the strip 4 and to provide a surface for securing the strip 6 thereto. As the meeting rails are moved together the lower portion of the strip 6 is moved into the lower portion of the strip 4 and due to the space 5 in the strip 4 the metal forming the chamber 7 in the strip 6 is yieldably engaged between the return bent edge and the body of the strip 4. By means of the angular portion 8 the edge 9 of the strip 6 is supported so that it is not bent inwardly by the return bent edge 5 of the strip 4 and thus a contact is maintained between the companion faces of the strips throughout the depth in which they are in engagement. By thus supporting the edge 9 the space between the upper and lower sash is sealed whether the strip 6 is inserted partially or to its full depth in the strip 4. It will thus be seen that a seal is provided even when the lower sash cannot be moved to the full downward position and when the upper sash cannot be moved to the full upward position. By this arrangement the strips will still function even though the building settles so that the companion meeting rails do not come to flush position. The upper edges of the weather strips 4 and 6 are provided with apertures 10 through which nails may be driven to secure the weather strips to the respective meeting rails and it will be noted that each strip is provided with a double thickness of metal to stiffen the weather strip at the point where it is nailed to the respective meeting rail.

It will be noted that the two parts of the weather strip are mounted in recesses of the respective rails provided intermediate the edges of the rails and the return-bent part of the strip 4 on the rail 1 lies in the recess of the rail 2 when the rails are in meeting relation. The weather stripping therefore is concealed and air flow that may reach the weather stripping is restricted by the meeting edges of the rails above and below the recesses.

From the foregoing description it becomes evident that the device is very simple and efficient in operation, will properly seal the space between the meeting rails even when the meeting rails do not come flush, is of very low manufacturing cost and provides a device which accomplishes the objects described.

Having thus fully described our invention, its utility and mode of operation, what we claim and desire to secure by Letters Patent of the United States is—

1. In a weather strip, a strip of metal bent upon itself to provide a double thickness throughout its length, the strip being formed to provide a space between the thicknesses of metal at the bent edge, the bent edge of the said strip being upturned to provide a U shaped channel between the upturned portion and the body portion, and a companion strip formed from a single thickness of metal return bent to provide a chamber, the metal enclosing the chamber being adapted to engage in the channel of the first named strip and the metal at the top of the chamber extending into engagement with the body of the strip to support and stiffen the chamber wall formed by the return bent portion.

2. In a weather strip, a strip formed from a double thickness of metal adapted to be secured to one meeting rail and having a return bent lower edge provided with a space between the two thicknesses of metal adjacent the return bent edge and a companion strip adapted to be secured to the companion meeting rail and formed to provide a chamber in the lower edge thereof, the metal forming the chamber being adapted to seat in the channel formed by the return bent edge of the first named strip.

3. In a weather strip, a strip formed from a double thickness of metal having a return bent lower edge formed to provide a space between the two thicknesses of metal adjacent the said edge and a companion strip provided with a return bent portion at the lower edge, the lower edge of the companion strip being adapted to engage in the channel formed by the return bent edge of the first named strip.

4. In weather stripping, the combination with the meeting rails of upper and lower sliding window sash each provided with a recess extending longitudinally thereof in spaced relationship with the upper and lower edges of the respective rail and in registration one with the other when the rails are in meeting relation, of a weather strip formed of companion parts one positioned within the recess of the meeting rail of the upper sash and the other positioned within the recess of the meeting rail of the lower sash, the strip in the recess of the rail of the upper sash being of U form one end of which is longer than the other and said other extending into the recess of the rail of the lower sash when the rails are in closed relation, and a companion strip for the recess of the lower sash consisting of a part bent upon itself to form a rounded entering edge movable into the space between the two legs of the first strip in wedging relation therewith.

5. In weather stripping, the combination with the meeting rails of upper and lower sliding window sash each having a recess intermediate its width in registration one with the other when the rails are in meeting relation, of a weather strip formed of companion parts secured in the respective recesses, the strip in the recess of the rail of the upper sash being formed of a sheet of metal bent upon itself intermediate its width with the two thicknesses in contact except at the bent edge, said strip being bent to U shape with the leg having the bent edge less in length than the other side of the U, the said bent edge extending into the recess of the rail of the lower sash when the rails are in meeting relation, the companion strip consisting of a strip bent upon itself in spaced relation for a length equal to the depth of the U and in contact for the remaining portion of its length and lying in spaced relation with a portion of its recess in the said meeting rail to engage in the U of the first strip when the rails are in meeting relation.

In testimony whereof we sign this specification.

JOSEPH P. GLASER.
LOUIS F. JULIEN.